(12) United States Patent
Singh

(10) Patent No.: US 7,021,272 B2
(45) Date of Patent: Apr. 4, 2006

(54) COMPUTER CONTROLLED MULTI-STROKE CYCLE POWER GENERATING ASSEMBLY AND METHOD OF OPERATION

(76) Inventor: Satnarine Singh, #2 Sunset Ridge, La Romain, Trinidad & Tobago (KN)

( * ) Notice: Subject to any disclaimer, the term of this patent is extended or adjusted under 35 U.S.C. 154(b) by 77 days.

(21) Appl. No.: 10/453,238

(22) Filed: Jun. 3, 2003

(65) Prior Publication Data
US 2003/0192489 A1 Oct. 16, 2003

Related U.S. Application Data

(63) Continuation-in-part of application No. 10/007,012, filed on Nov. 5, 2001, now Pat. No. 6,571,749, which is a continuation-in-part of application No. 09/465,329, filed on Dec. 17, 1999, now Pat. No. 6,311,651.

(51) Int. Cl.
*F02B 77/00* (2006.01)

(52) U.S. Cl. .................................................. 123/198 F
(58) Field of Classification Search .............. 123/198 F, 123/25 C, 64, 58.8, 198 DB, 198 DC
See application file for complete search history.

(56) References Cited

U.S. PATENT DOCUMENTS

| | | |
|---|---|---|
| 1,339,176 A | 5/1920 | Dyer |
| 1,501,392 A | 7/1924 | Burtnett et al. |
| 2,671,311 A | 3/1954 | Rohrbach |
| 3,964,263 A | 6/1976 | Tibbs |
| 4,022,164 A * | 5/1977 | Fuchs .................. 123/339.14 |
| 4,143,518 A | 3/1979 | Kellogg-Smith |
| 4,423,709 A * | 1/1984 | Arrieta .................. 123/198 F |
| 4,588,040 A * | 5/1986 | Albright et al. ............ 180/165 |
| 4,736,715 A | 4/1988 | Larsen |
| 4,976,226 A | 12/1990 | Herman |
| 5,606,946 A * | 3/1997 | Data et al. ................ 123/198 F |
| 6,095,100 A | 8/2000 | Hughes |
| 6,112,705 A | 9/2000 | Nakayama et al. |
| 6,311,651 B1 * | 11/2001 | Singh ....................... 123/25 C |
| 6,442,455 B1 * | 8/2002 | Kotre et al. ................. 701/22 |
| 6,571,749 B1 * | 6/2003 | Singh ....................... 123/25 C |

* cited by examiner

*Primary Examiner*—Henry C. Yuen
*Assistant Examiner*—Jason Benton
(74) *Attorney, Agent, or Firm*—Malloy & Malloy, P.A.

(57) ABSTRACT

An internal combustion engine and its method of operation including at least one embodiment operating on a six-stroke cycle and including at least one piston and cylinder assembly. The six-stroke cycle includes two power strokes, the latter of which is the result of a water to steam conversion process utilizing the heat of the exhaust gas from the first power stroke. A second embodiment comprises a hybrid power generating assembly incorporating alternative, first and second power sources respectively comprising an internal combustion engine and a water injection engine, the latter of which operates on the water to steam conversion process, wherein the required heat therefore is derived from the exhaust gas of the internal combustion engine. The second power source drives a source of electric energy which powers an electric motor, wherein the electric motor and the internal combustion engine are both connected in driving relation to a power take-off.

27 Claims, 4 Drawing Sheets

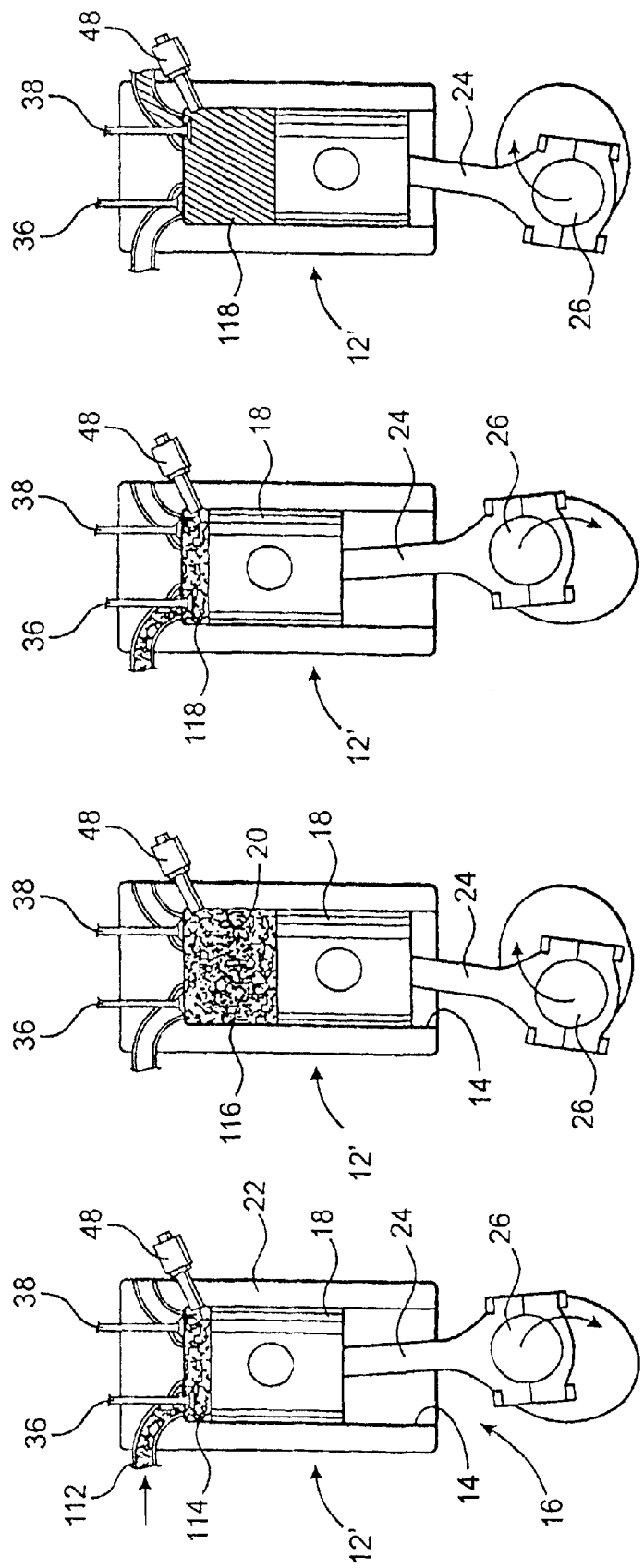

COMPUTER CONTROLLED MULTI-STROKE CYCLE POWER GENERATING ASSEMBLY AND METHOD OF OPERATION

CLAIM OF PRIORITY

The present application is a continuation-in-part application of previously filed, currently pending application having Ser. No. 10/007,012, filed on Nov. 5, 2001, now U.S. Pat. No. 6,571,749, issued Jun. 3, 2003, which is a continuation-in-part of application Ser. No. 09/465329, filed on Dec. 17, 1999, now U.S. Pat. No. 6,311,651 issued on Nov. 6, 2001, wherein all of the above are incorporated herein in their entirety by reference.

BACKGROUND OF THE INVENTION

1. Field of the Invention

This invention relates to a computer controlled, internal combustion engine designed to operate on a six-stroke cycle, wherein water is injected into each of the one or more cylinders during a predetermined portion of the six-stroke cycle depending upon the energy content within the cylinder subsequent to ignition of the conventional air-fuel mixture. The residual heat from the ignited air-fuel mixture serves to convert the injected water into steam on a controlled basis, thereby creating an auxiliary power stroke.

2. Description of the Related Art

It is well known that for over a hundred years the internal combustion (IC) engine was and is the dominating source of power for motorized vehicles. Other than rotary engines, the typical IC engine incorporates a plurality of piston and cylinder assemblies each of which includes a cylinder having a piston reciprocally mounted therein and wherein a combustible fluid, such as an air-fuel gaseous mixture, is forced into the interior of the cylinder, compressed and subsequently ignited. The ignition of the combustible fluid causes a significant expansion of gases within the cylinder, resulting in the piston being forced downwardly within the cylinder and thereby, defining what is commonly known as a "power stroke". The piston is drivingly connected to a crank shaft which is drivingly connected to the remainder of the drive train associated with the motorized vehicle.

Over the years, numerous attempts have been made to increase the efficiency of IC engines, while at the same time protecting the environment by eliminating or significantly reducing the exhausting of pollutants into the surrounding atmosphere. Attempts to protect the environment, have resulted in significant improvements in exhaust systems, fuel compositions and other operational components of modern IC engines, which sometimes derogatorily affect the efficiency or performance characteristics of such engines. Other attempts to improve the performance of IC engines, without harming the environment, have the included the design of an IC engine which operates on a six-stroke cycle. In such designs, the first four strokes function as a conventional internal combustion engine and include an intake stroke, compression stroke, power stroke and exhaust stroke. The last two strokes of the six-stroke cycle include the injection of water into the combustion chamber for purposes of converting the water to steam by using the residual heat remaining therein. The expansion of the steam is intended to provide an additional power stroke, without additional fuel or combustible fluid being supplied. However, for the most part, such known attempts have failed to provide an internal combustion engine capable of operating on a six-stroke cycle, which is sufficiently efficient and effective for wide spread commercial use.

In order to understand the problems associated with the effective development of an IC engine of the type set forth above, it is important to understand the relationship between water, steam, temperature and pressure, all of which are governed by the laws of thermodynamics, and more specifically, by what are commonly referred to as the "Steam Tables". Accordingly, and based on these laws, it is well recognized that in a closed container or system, for example, heated water will be maintained in a liquid state at a temperature of 297 degrees Fahrenheit, only as long as the pressure is maintained at a minimum of 50 PSI. However, if the heated water were suddenly to be released from the closed container into atmosphere it would immediately "flash" into steam due to the significant drop in pressure. The reason for this instant conversion into steam is because the water has sufficient latent heat for the steam conversion and no longer has to absorb heat from an exterior source.

Prior attempts to take advantage of the force generated when the water converts to steam in the combustion chamber or cylinder an IC engine have, for the most part, failed due to the fact that the water was injected and allowed to convert or "flash" into steam at the wrong time during the six-stroke cycle. Allowing all of the water injected into a cylinder to simultaneously flash into steam would most probably result in damage to the engine due to the "instant" expansion force created. Rather than developing a power stroke in the engine, such an expansive force would have a tendency to crack the engine block or cause a failure in the seals between the piston and the interior surface of the cylinder. Accordingly, it is believed by the inventor hereof that in order to develop an efficient IC engine incorporating the conversion of injected water into steam, the conversion should be controlled and take place continuously or gradually over the duration of a specific predetermined portion of the six-stroke cycle, rather than instantaneously upon injection of the water into the cylinder.

The failure of previous attempts at water to steam conversion is further evidenced by an explanation of the ignition of a conventional air-fuel mixture in a conventional IC engine. More specifically, after the air-fuel mixture is compressed and ignited, the mixture burns and expands, thereby supplying a continuous force which drives the piston the length of the cylinder resulting in a "power stroke". This happens because the combustion of the air-fuel mixture occurs on a substantially continuous basis as the piston travels the length of the cylinder during the power stroke. All of the force or power resulting from the ignition of the air-fuel mixture is not released or exerted on the piston at one point in time. Therefore, it is believed by the inventor hereof that the control of the conversion of water into steam should similarly occur on a continuous rather than an instantaneous basis in order for such conversion to produce an effective and efficient additional power stroke in a six-stroke cycle.

Another characteristic common to known attempts to develop a six-stroke cycle IC engine is the premature exhausting of the conventional air-fuel mixture after it has been ignited. It is generally accepted that approximately 30% of the energy (heat) of the fuel charge is lost in the exhaust gases due to inherent designs of known or substantially conventional IC engines. However, if the exhaust gases can be maintained within the cylinder and properly mixed with a quantity of water being injected, the heat energy still remaining in the previously ignited fuel charge can be utilized to add another power stroke, occurring upon the conversion of water into steam within the cylinder.

Based on the above, there is a significant and recognized need for the development of an improved internal combustion engine which is capable of efficiently operating on a six-stroke cycle which includes the development of an additional power stroke through the injection of water into the cylinder or combustion chamber and the conversion of water into steam. The water to steam conversion should occur on a controlled basis and be at least partially dependent on the energy content within the cylinder, subsequent to ignition of a conventional air-fuel mixture and prior to the ignited air-fuel mixture being exhausted. Any such improved internal combustion engine should preferably have the injection of water and its conversion into steam controlled by a computer assembly or central processor, properly programmed in accordance with the related laws of thermodynamics and the conversion of water to steam in accordance with the "Steam Tables".

Moreover, recent attempts have been made, particularly in the motor-vehicle industry to develop a vehicle capable of being operated by a power generating assembly incorporating alternative sources of power. Such vehicles and their associated engines or power generating assemblies are commonly known as hybrid vehicles or vehicles incorporating a "hybrid power-train". Commercially available vehicles incorporating hybrid power-trains include the Toyota™ Insight™ and the Honda™ Prius™. An operative advantage of these two vehicles include the fact that they are considered charge sustaining gasoline/electric hybrids. This means that neither vehicle requires the recharging of the battery assembly associated therewith from a conventional, stationary electrical power source. To the contrary both vehicles charge their individual battery assemblies from energy that would otherwise be wasted. However it is important to note that the charging facilities associated with the power-trains of both vehicles use gasoline as their sole external source of energy. Further advantages of hybrid vehicles which incorporate electric technology is that the gasoline engine and the electric motor are each used for what they do best. More specifically, the gasoline engine is available for long range travel in that it uses gasoline as its high density power source. To the contrary, the electric motor allows for efficient capturing and reusing excess energy without requiring prolonged downtime for recharging at the aforementioned type of stationary recharging stations. The end result is a savings of gasoline utilized by hybrid vehicles of this type, thereby possibly providing a significant reduction in the consumption of fossil fuels, which of course is a major concern throughout the world.

Therefore, assuming that hybrid vehicles may become increasingly popular to the consuming public and as such proliferate, there is also a significant need for a hybrid vehicle providing even a greater operational efficiency and that capable of hybrid vehicles of the type set forth above. Moreover, there is a significant and long recognized need for a power generating assembly, particularly adaptable for use in motor vehicles which incorporates alternative sources of power. An improved power generating assembly of the type referred should be capable of accomplishing a recognizable increase in efficient operation at least partially through the use of a water to steam conversion process. In addition such a conversion process may best be controlled by a computer assembly or a cental processor properly programmed in accordance with the related laws of thermodynamics. As such, an improved hybrid vehicle incorporating the principles as set forth above would utilize an internal combustion and an electric motor assembly connected in driving relation to the power takeoff of the vehicle. In addition, a second power source other than the internal combustion engine could be structured to directly power a source of electric energy incorporating both a generator and a battery assembly facility connected to and supplying electrical energy directly to the electric motor assembly.

SUMMARY OF THE INVENTION

The present invention is directed towards a computer controlled internal combustion (IC) engine, and its method of operation, designed to operate on a six-stroke cycle and specifically includes the injection of water into the combustion chamber or cylinder of each of a plurality of piston and cylinder assemblies, during a predetermined portion of the six-stroke cycle. More specifically, the quantity and timing of the water injection is controlled and regulated to the extent that the injected water is prevented from turning into steam even after reaching sufficiently high temperatures because of the continuously increasing pressure within the cylinder, due to the compression of gases therein, to the extent that the water is maintained in a liquid state until the beginning of an intended "auxiliary" power stroke.

More specifically, the IC engine of the present invention comprises at least one, but preferably a plurality of piston and cylinder assemblies. Each such piston and cylinder assembly includes a cylinder which serves as a combustion chamber having a piston reciprocally mounted therein, and further including intake and exhaust valves associated therewith so as to regulate the flow of fluid into an out of the cylinder. A source of ignition is also connected to each chamber and may be in the form of a spark plug, glow plug or any other applicable and/or conventional means of igniting a combustible fluid, such as a gaseous mixture of fuel and air.

In addition to the above, the improved IC engine of the present invention includes an injection assembly comprising one or more injector structures associated with each of the cylinders and disposed and structured to inject predetermined quantities of water at predetermined rates and times into the individual cylinders under the control and regulation of a central processor. A central processor or computer of the general type referred to is known in the automobile and/or internal combustion engine industry for the control and regulation of a variety of operating conditions of the IC engine. The central processor of the present invention is responsive to a plurality of sensors, all of which serve to define a sensor assembly, which sense and/or determine certain predetermined physical characteristics relating to the operation and performance of the engine.

As will be explained in greater detail hereinafter a variety of physical characteristics determined by the plurality of sensors may be used to determine the "energy content" within the cylinder during a predetermined portion of the six-stroke cycle. In turn, the energy content of a cylinder is used in determining the quantity and duration of water injection into the cylinder. Such physical characteristics may include, but are not limited to, the pressure and temperature of the interior of each cylinder at a first predetermined portion of the six-stroke cycle. The determination of the pressure and temperature may be used in the calculation of the energy content within the cylinder during a portion of the six-stroke cycle and is subject of U.S. Pat. No. 6,311,651 by the inventor hereof, which is incorporated in its entirety herein by reference.

In addition, one or more of the plurality of sensors are mounted on the engine to determine the engine speed as well as the temperature of the water being injected into the cylinder prior to its injection. The determination of the engine speed by the sensor assembly will, in turn, inform the central processor of the rate of travel of the pistons within respective ones of the cylinders. Since it is important that water, when injected into the cylinder absorb the maximum amount of heat without turning into steam, the determination of the central processor of the rate of travel of the piston within the cylinder will allow the central processor to determine the length of time a predetermined stroke exists. This in turn will allow the central processor to inject water into the cylinder at a time during a predetermined stroke that will allow the injected water to spend the maximum amount of time in the cylinder and thereby absorb the maximum amount of heat, without turning into steam. Informing the central processor of the amount of time the various quantities of injected water spend in the cylinder, absorbing heat, better assures that maximum heat energy is extracted, thereby resulting in a more efficient auxiliary power stroke being subsequently produced. The temperature of the water prior to it being injected into the cylinder will also be communicated to the central processor so as to aid in the calculation of the amount of heat required to convert the water into steam specifically during the second predetermined portion of the sixth stroke cycle.

The central processor will thereby be informed of the operating and performance characteristics of the IC engine under varying speed and load conditions. Such operating conditions will, of course, have a direct effect on the physical conditions within each of the cylinders during the operation of the IC engine. As a result the "energy content" of each cylinder, immediately prior to and during the injection of water into the cylinder will be determined at least partially by the central processor in order to determine the quantity of water to be injected into the cylinder as well as the time and duration of such injection.

More specifically, the quantity of water to be injected can be calculated based on the amount of heat required to convert it to steam. Also, the amount of water to be injected will be determined by the temperature of the water before its injection into the cylinder. It should be apparent that the higher the temperature of water being injected into the cylinder the greater the quantity of water that can be injected, in that less heat will have to be absorbed from the "energy content" of the interior of the cylinder into which the water is to be injected, to convert the injected water into steam.

Another directly related responsibility of the central processor is to calculate when or over what duration of the six-stroke cycle is the water to be injected. The timing of the water injection is important in order to prevent the water from being converted into steam during the compression stroke upon its injection into the cylinder. More specifically, as the water is injected, its temperature significantly and rapidly increases. Accordingly, the pressure exerted on the injected water must also significantly and proportionally increase in order to prevent the formation of steam.

As set forth above, the inventor herein described in detail in the above noted U.S. Pat. No. 6,311,651 that the "energy content" was capable of being determined by the on-board processor using physical parameters of the engine which included the temperature, pressure and volume of the cylinder. However, as an alternate and preferred embodiment to the invention described in the aforementioned patent, energy content or "remnant energy" may be determined in a different manner with minimal or no significant modification to the software of the on-board processor.

Accordingly, in the preferred embodiment of the present invention, the determination of the energy content or remant energy within a given cylinder is derived by what may be generally referred to as a "default" determination or computation. As will be described in greater detail hereinafter, a key element in this default determination is the recognition of a predetermined value of the thermal efficiency of a particular IC engine operating under various load conditions. It is universally recognized that the thermal efficiency is the quantity of heat that is converted to motive force at the wheels of the vehicle. Further, the average thermal efficiency of an internal combustion engine is generally recognized as being generally in the range of 40%. A more precise thermal efficiency value can of course be provided, such as by the manufacturer of the engine. Accepting this 40% value for purpose of clarity, leads to the conclusion that generally 60% of the heat or energy goes to waste. In turn, the waste heat is distributed between exhaust gasses, heat detracted by the cooling system and a certain amount of loss due to friction.

Therefore, as part of the aforementioned default computation, it is understood that a predetermined amount of heat energy created by the fuel injected into a cylinder is exhausted, in a conventional four stroke cycle engine, in the fourth or exhaust stroke. As a result, the energy content can be determined, by "default" once it is recognized that the thermal efficiency of the engine has a predetermined recognized value as well as the fact that generally half of the heat energy lost is in the gasses that are exhausted. Accordingly, the energy content during the third stroke of the six-stroke cycle engine, of the present invention, can be accurately and simply determined by "default", after ignition and expansion of the substantially standard fuel/air mixture.

Further, in this preferred embodiment of the present invention, the end of the third stroke represents the beginning of the second predetermined portion of the cycle of the sixth stroke cycle engine, during which the injection of water begins. This of course differs from the injection of water only during the fourth stroke, as described in detailed in the above noted U.S. Pat. No. 6,311,651 by the inventor herein.

During the fourth stroke or subsequent compression stroke, the piston is rising through the cylinder so as to compress its contents, including both the combustible fluid, which had already been ignited, and the water being injected. Therefore, as the water is continuously and/or periodically being injected, in an amount based on the aforementioned "energy content" of the cylinder, during a portion or at least a majority of this compression stroke, the pressure thereon is continuously increasing. The injection of the water in a regulated and controlled manner by the central processor, as set forth above, will force the water to be maintained in a liquid state and prevent its conversion into steam until the beginning of the following power stroke. This following stroke will define an "auxiliary" power stroke because of a forced travel of the piston upon the conversion of the water into steam. The result will be a gradual decrease in pressure as the piston moves towards its bottom dead center (BDC) position during this auxiliary power stroke. Therefore, subsequent to the compression of the ignited combustible fluid and the injected water, the piston will began its travel from its top dead center (TDC) position to the BDC position with the resulting gradual decrease in pressure on the injected water. Accordingly, there will be a continuous or gradual conversion of the water into steam because of the pressure reduction thereon and the fact that the water has absorbed sufficient heat from the "energy content" within the cylinder into which it is being injected to accomplish the water to steam conversion. As set forth above, this conversion will generate an auxiliary power stroke as the piston is forced to travel from its TDC position to its BDC position.

Therefore, the improved IC engine of the present invention will allow the development of significantly more power from relatively smaller size engines while operating at an increased efficiency level. The increase in efficiency will be due to the development of two power strokes using the same amount of combustible fluid or air-fuel mixture. The admission of pollutants into the atmosphere will also be reduced since the exhausting of the previously ignited combustible fluid only occurs at the end of the six-stroke cycle, along with the steam. Further, the resulting IC engine can operate on a lower compression ratio, thereby eliminating the necessity of using more expensive, high octane fuels. In addition to the above, the computer controlled IC engine of the present invention will be environmentally friendly by enabling the use of less combustible or fossil fuel, while allowing the engine to do a greater amount of work.

Another preferred embodiment of the present invention is directed to a power generating assembly which is particularly, but not necessarily exclusively, capable of being used as a power plant in a motor vehicle. However, while incorporating many of the structural operational features of the above set forth embodiments, the power generating assembly of the present invention may not include a six stroke cycle having both primary and auxiliary power strokes. However, the power generating assembly defining this preferred embodiment of the present invention does incorporate a continuous and gradual conversion of water into steam as injected water absorbs sufficient heat from the "energy content" within the cylinder into which it is being injected to accomplish the water to steam conversion. Further, in its most preferred form the power generating assembly of the present invention may be generally defined as a "hybrid power-train" in that both an internal combustion (IC) engine and an electric motor are cooperatively structured and disposed in driving connection to the power-takeoff or driving wheels of the vehicle in which it is installed.

While the preferred embodiments of the present invention relating to an IC engine operating through a six stroke cycle are operative for their intended purpose, it has been determined that certain disadvantages may exist therein. More specifically, the first three strokes of the afore-mentioned six stroke cycle function substantially in the conventional fashion of known IC engines, wherein the expected power output or power stroke is the result of a fuel charge being ignited. As such, when the gaseous fuel is ignited within the cylinder, the air is heated rapidly as the combustion process occurs. To this extent, the combustion process can be considered a rapid "chemical reaction" as the ignited charge expands and creates the first or primary power stroke.

However, in the subsequent three strokes of the six stroke cycle, energy is produced in compressing the heated and ignited charge concurrently to water being injected into the cylinder. During the water injection, heat from the exhaust of the ignited fuel mixture is absorbed by the injected water, but this heat abortion is done on a more "timely basis". As a result, it has been found that the time consumed in accomplishing the fourth stroke may be insufficient or inadequate to absorb enough heat to create a sufficient quantity of steam. This latter water to steam conversion segment of the operative cycle may be considered a "mechanical process" of heat transfer where time is of great importance.

Therefore it may be generally considered that the "chemical process" which defines the ignition of the fuel mixture and the "mechanical process" of the water to steam conversion process are not compatible if attempted at the same engine speed. As such, the time allotted for completion of the fourth stroke, when the water is converted to steam, is insufficient to allow the injected water to absorb a sufficient quantity of heat to produce a requisite amount of steam.

Naturally, the engine cannot be reduced in speed during the fourth stroke to permit the right amount of heat transfer to accomplish an efficient conversion of water to steam. Therefore, the preferred embodiment of the present invention is directed to a power generating assembly which overcomes the above set forth problem by comprising alternative power sources more specifically referred to hereinafter as a first power source and a second source. As such, the first power source, being an IC engine may operate within a first speed range. The second power source which may be generally referred to as a water injection engine is mechanically independent of the IC engine of the first power source and therefore may operate at a second speed range which is slower than that of the first speed range at which the IC engine operates. As such, the water to steam conversion process has sufficient time to absorb a requisite amount of heat to operate efficiently Further distinguishing features of the power generating assembly include the IC engine of the first power source connected in direct driving relation to the power takeoff of the vehicle such as the driving wheels. To the contrary the second power source, being defined by the water injection engine, is connected in driving relation to a source of electric energy and is not connected in direct driving relation to the power takeoff.

Therefore, the hybrid categorization of the power generating assembly of the present invention is based on the use of the electric motor assembly, at least partially powered by the aforementioned source of electric energy, in combination with the aforementioned IC engine. As with known hybrid power plants, the IC engine defining the first power source and the electric motor are both connected in driving relation to the power take-off, such that the vehicle in which the power generating assembly is mounted is concurrently and/or independently powered by the IC engine and/or the electric motor assembly. Determination of the power take-off being powered by the IC engine and/or the electric motor assembly may be at least partially dependent on load conditions of the vehicle. By way of example, under zero or light load conditions, such as when the vehicle is stopped, involved in a traffic jam, etc, the electric motor may be the sole source of power of the vehicle. However, under heavier load conditions the IC engine and the electric motor may both operate to concurrently provide power to the drive wheels or power take-off. It is emphasized that regardless of the load requirements, operation of the IC engine is necessary to provide sufficient heat, by means of its exhaust gas, to the water injection engine. This will assure an efficient water to steam conversion and that a reliable source of electric energy is available to provide sufficient electric energy to the motor on a demand basis.

As will also be explained in greater detail hereinafter, additional structural and operative features of the power generating assembly embodiment of the present invention include the source of electric energy being comprised of a generator and a battery assembly. Moreover, the second power source defined by the water injection engine is connected in direct driving relation to the generator. In turn, the generator is electrically connected to the battery assembly to facilitate and assure that the battery assembly will remain charged at all times in order that sufficient electric energy may be delivered to the electric motor on demand. Due to the fact that the second power source or water injection engine may operate independently of and therefore at a slower speed than the IC engine, sufficient time is provided for the injected water to absorb sufficient heat to be efficiently accomplish an effective water to conversion process and the development of sufficient power to drive the generator of the source of electric energy.

In a most preferred embodiment the IC engine of the first power source and the water injection engine of the second power source are mounted on a common engine block. Such efficient structuring is due, at least in part, to a reduced size of the IC engine, which is made possible because the power demands of the vehicle are shared by both the IC engine and the electric motor. Further, each of the first and second power sources comprise at least one piston and cylinder assembly operative on multi-stroke cycle, preferably such as a four stroke cycle, rather than the aforementioned six stroke cycle through which the preceding preferred embodiments of the present invention operate. Sufficient heat is transferred to the water injection engine to perform the water to conversion process by means of directing exhaust gas from the IC engine to the water injection engine. Other structural and operative features associated with an exhaust processing assembly are included in the power generating assembly embodiment of the present invention to assure that sufficient quantities of exhaust gas, and therefore heat, is delivered to the water injection engine in an efficient and effective manner.

While the power generating assembly embodiment of the present invention is clearly distinguishable from the other preferred embodiments thereof which incorporate a six stroke cycle it should be apparent that the advantages of the water to conversion process is incorporated in the power generating assembly in order to more effectively produce a hybrid power plant which overcomes many of the disadvantages associated with known hybrid engines.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIGS. 4A through 4D consecutively represent successive strokes of a multi-stroke cycle of a piston and cylinder assembly incorporated within one of the alternative power sources of the power generating assembly of the embodiment of FIG. 3.

Like reference numerals refer to like parts throughout the several views of the drawings.

DETAILED DESCRIPTION OF THE PREFERRED EMBODIMENT

The present invention is directed towards a computer controlled internal combustion (IC) engine, and its method of operation, wherein the IC engine is designed to operate on a six-stroke cycle and provide an auxiliary power stroke through the regulated injection of water into the combustion chamber or cylinder of one or more piston and cylinder assemblies of the engine and the conversion of the injected water into steam. It is emphasized that while the present invention will be explained primarily with reference to a single piston and cylinder assembly having an at least partially conventional design, the computer controlled IC engine of the present invention may be of the type incorporating one or a plurality of such piston and cylinder assemblies and may be specifically adapted for use as the power source in an automobile, truck or other motorized vehicle.

Figure 1:
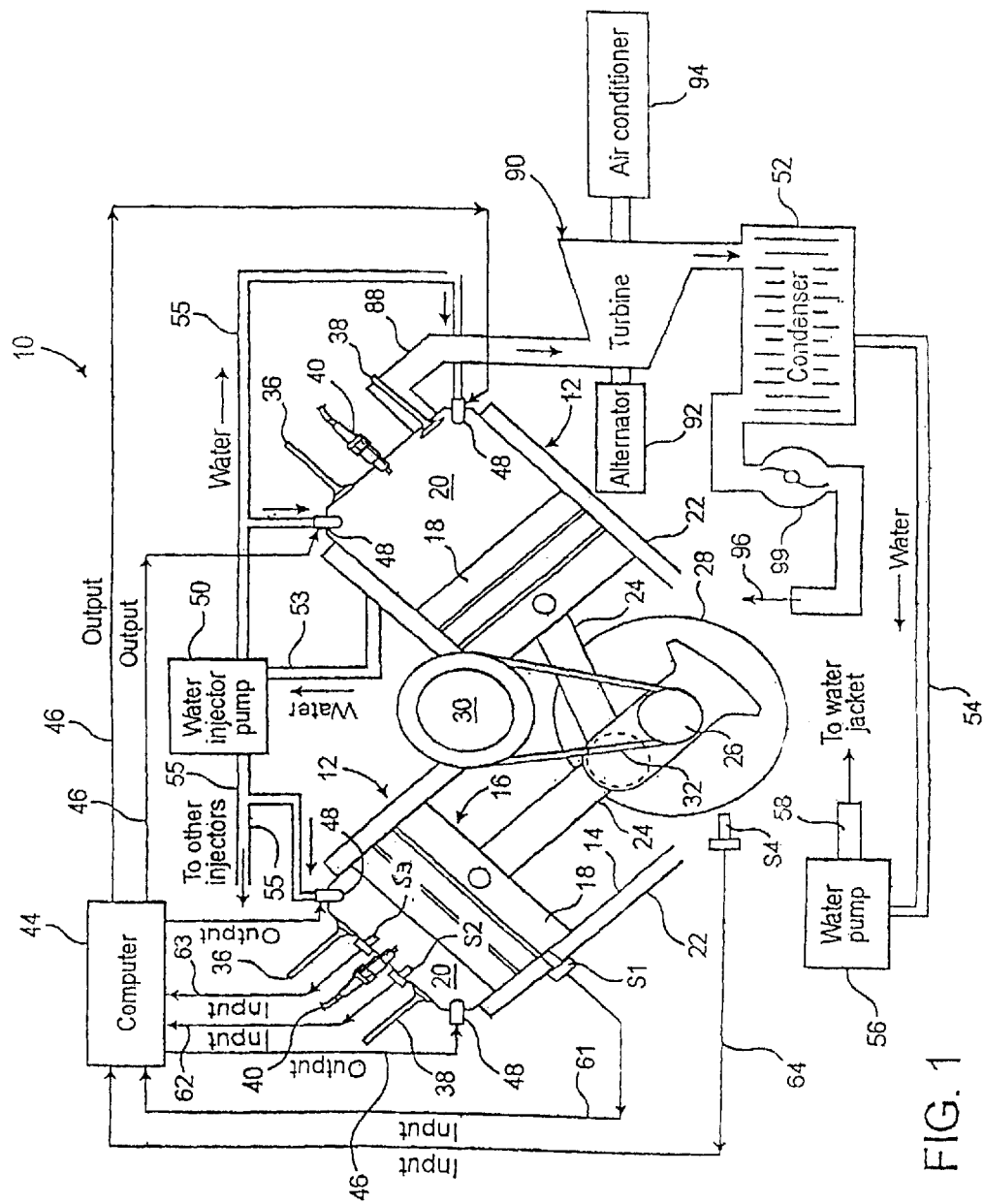
FIG. 1 is a schematic representation of various operative components of a computer controlled internal combustion engine according to the present invention.

With reference to the accompanying Figures, the IC engine of the present invention has a plurality of operative components schematically represented in FIG. 1 and collectively indicated as 10. The IC engine 10 comprises preferably a plurality of piston and cylinder assemblies generally indicated as 12 which include a cylinder 14 having a piston 16 including piston head 18 reciprocally mounted within the interior 20 of the cylinder 14. A water jacket 22 is disposed in surrounding relation to the cylinder 14 and is designed to have a quantity of water circulating there through so as to provide proper cooling to each of the piston and cylinder assemblies 12. The piston heads 18 are connected by piston shafts 24 to a driven crank shaft 26 attached to fly wheel 28. In addition, a cam shaft 30 is driven by an interconnecting belt or like structure 32 and is rotated or driven at an applicable gear ratio, such as a preferred ratio of 3 to 1. In addition, each of the piston and cylinder assemblies 12 includes an intake valve 36 and an exhaust valve 38 cooperatively structured to regulate fluid flow into an out of the interior 20 of the cylinder 14. An ignition source 40 may be in the form of a spark plug, glow plug or any other means for igniting a combustible fluid, such as a conventional air-fuel gaseous mixture, in an internal combustion engine.

The IC engine, as described above, will operate in a conventional fashion through the first three strokes of the aforementioned six-stroke cycle to the extent that a combustible air-fuel gaseous mixture will be forced into the cylinder interior 20 by appropriate structure (not necessary to be shown as this is within the knowledge of persons of skill in the art), where it will be compressed and subsequently, ignited by the ignition source 40. Upon ignition, the expansion of the ignited gasses will cause the piston 18, in each of the cylinders 14, to be driven downwardly from its top dead center (TDC) position to its bottom dead center (BDC) position, thereby defining a power stroke. The power stroke drives the crank shaft 26 and fly wheel 28 and provides moving force to the vehicle in which the IC engine 10 is mounted.

With further reference to FIG. 1, important operative components of the present invention include a computer or central processor 44 which is interconnected by outputs 46 to a plurality of injector structures 48. Each of the cylinders 14 has at least one, but preferably, a plurality of the injector structures 48 mounted thereon in direct fluid communication with the cylinder interior 20. The injector structures 48 are designed to direct water at prescribed times and in a prescribed manner into the cylinder interiors 20. As will be explained in greater detail hereinafter, the water may be injected in small amounts or "periodically" during a predetermined portion of the six-stroke cycle.

The water to be injected is preferably supplied from the water circulating through the water jackets 22 surrounding each of the cylinders 14. The water jackets 22 may comprise a part of a water supply and what may be referred to as a closed water system. The term "closed water system" refers to the fact that the water injected into the interior 20 of each of the cylinders 14 is retrieved and re-circulated so as to flow back into the interior of the water jackets 22 to maintain the predetermined lower temperature of the cylinders 14. As will be explained in greater detail hereinafter, the closed water system also includes a water injector pump 50 connected by appropriate conduit 53 and 55 between the one or more water jackets 22 and each of the injector structures 48. The closed water system further preferably includes a condenser 52 designed to receive steam from the exhaust exiting each of the cylinder interiors 20, through outlet 88. The condenser 52 collects the water recovered by condensing the retrieved steam and forces it through return line 54 by means of a water return pump 56. The water is further directed by conduits 58 back to each of the one or more water jackets 22, thereby further defining the aforementioned closed water system.

As set forth above, one inventive feature of the present invention is the injecting of the water in specific quantities and during a specific portion of the six-stroke cycle, wherein the amount and time of water injection for each cylinder is controlled by the central processor 44. In order to aid in the determination of at least some of the parameters as set forth above, a sensor assembly is mounted on the various operative components of the IC engine 10 and is structured to determine certain physical characteristics of the engine. Further, the sensor assembly transmits the sensed or determined data to the central processor 44 for processing. Accordingly, the sensor assembly of the present invention comprises at least one, but preferably, a plurality of sensor structures mounted at various locations on the IC engine 10 and which are specifically structured to sense and determine specific, predetermined physical characteristics required for appropriate calculation by the central processor 44.

The plurality of sensors of the sensor assembly includes a sensor structure $S_1$ mounted in the vicinity of the water jacket 22 and structured to determine the temperature of the water prior to it being injected into the cylinder interior 20. The temperature of the water prior to injection is important because the greater the temperature of the water to be injected the greater quantity of water that can be injected because less heat is required to be absorbed from the "energy content" of the cylinder to convert the water into steam. More specifically, the hotter the water being injected, the less amount of heat or energy need be taken from the interior of the cylinder, subsequent to the combustible fluid being ignited, in order that the water be converted into steam in a controlled manner, as will be explained in greater detail hereinafter.

The sensor assembly of the present invention also includes at least one but preferably a plurality of additional sensor structures $S_2$ and $S_3$ both of which may be mounted in the same cylinder interior 20 or each of which may be mounted in a different cylinder interior. Therefore, the temperature and pressure of the cylinder interiors 20 of the various piston and cylinder assemblies 12 may also be determined and directed to the central processor 44 for further processing. As set forth above the temperature and pressure of the cylinder interior are primarily used in determining the "energy content" of the cylinder immediately prior to the injection of water therein, when practicing an alternate embodiment of the present invention disclosed and claimed in the above noted patent, by the inventor herein.

While the determination of the energy content in the preferred embodiment as described hereinafter differs from that of the above noted patent, it is emphasized that the determination of the energy content will directly affect the quantity of water being injected as well as the time and/or duration such water injection will take place during a predetermined portion of the six-stroke cycle. Also, a sensor structure $S_4$ is mounted on the engine in the vicinity of the fly wheel 28 and/or crank shaft 26 in order to determine engine speed. Engine speed is, of course, directly related to the speed of the travel of the piston head 18 within the cylinder interior, which in turn may be communicated to the central processor 44 so as to determine the length of time a particular stroke exists during the six-stroke cycle.

In order to obtain the maximum power from the auxiliary power stroke or fifth stroke, the injected water should remain within the cylinder a maximum amount of time, during the fourth stroke, so as to absorb a maximum amount of heat, without turning into steam during the fourth stroke. Heat absorption during the fourth stroke depends, at least in part, upon the length of time of the fourth stroke and that time is dependent on the time the piston head 18 takes to travel from its BDC position to its TDC position. The central processor 44 must be informed of the amount of time each injection of water spends in the cylinder absorbing heat, during the fourth stroke, without turning into steam, so that the maximum heat energy can be extracted, thereby assuring that a more efficient fifth stroke or auxiliary power stroke is produced. The length of time of the fourth stroke is measured by determining the engine speed which, as set forth above, is directly related to the time of travel of the piston head 18 from BDC to TDC. The data relating to engine speed, as determined by sensor structure $S_4$, is particularly important when the vehicle is operating at varying speed or load conditions. Such varying operative conditions will have a direct effect on the mass of combustible fluid forced into the interior 20 of each of the cylinders 14.

Interconnection between each of the plurality of sensor structures $S_1$, $S_2$, $S_3$, and $S_4$ is by means of any type of applicable electrical connection such as at 61, 62, 63 and 64 respectively. It should also be noted that for purposes of clarity, FIG. 1 depicts the various sensors $S_2$ and $S_3$ being mounted in operative position with regards to only a single cylinder interior 20. However, it is emphasized that an increased number of such sensor structures can be mounted in operative relation to each of the piston and cylinder assemblies 12 which are incorporated in the IC engine 10 of the present invention.

Figures 2A, 2B, 2C:
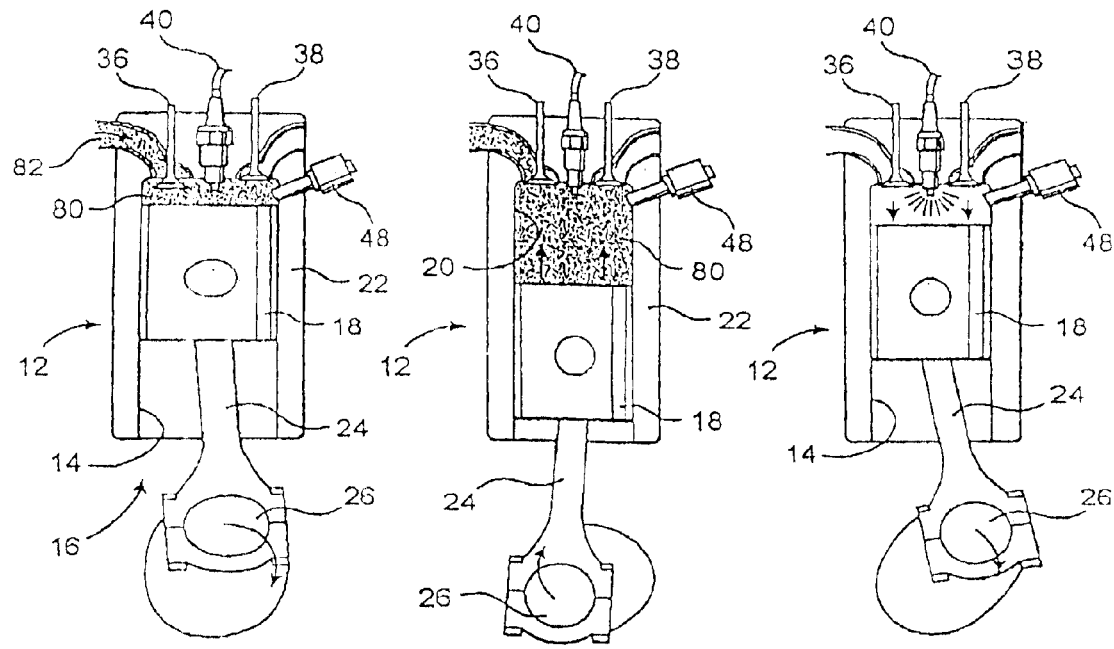
FIGS. 2A through 2F consecutively represent successive strokes of at least one of a plurality of piston and cylinder assemblies incorporated within the internal combustion engine of the present invention while operating on a six-stroke cycle.

FIGS. 2A through 2F, demonstrate the operation of the internal combustion engine 10, by a successive representation of each stroke of a six-stroke cycle, wherein the six-stroke cycle comprises a first intake stroke demonstrated in FIG. 2A. During the intake stroke, a combustible fluid 80, preferably in the form of an air-fuel gaseous mixture, is drawn into the interior of the cylinder 20 through inlet 82 upon an opening of the intake valve 36. As crank shaft 26 serves to rotate the piston 16, the piston head 18 travels along the length of the cylinder interior 20 until it reaches its Bottom Dead Center (BDC) position, which defines the beginning of a compression stroke, illustrated in FIG. 2B.

The compression stroke of the six-stroke cycle is characterized by the intake and exhaust valves 36 and 38 respectively, both being maintained in a closed position, such that the upward travel of the piston head 18 within the cylinder interior 20 will cause a compression of the combustible fluid 80 as the piston head 18 reaches its Top Dead Center (TDC) position at the beginning of a third or power stroke, represented in FIG. 2C. Upon compression being completed as the piston head 18 reaches TDC, the ignition source 40 will be activated to ignite the combustible fluid 80 forcing the piston head 18 downwardly into its BDC position and causing the forced rotation of the crank shaft 26. The BDC position of piston head 18 is represented in FIG. 2D.

Figures 2D, 2E, 2F:
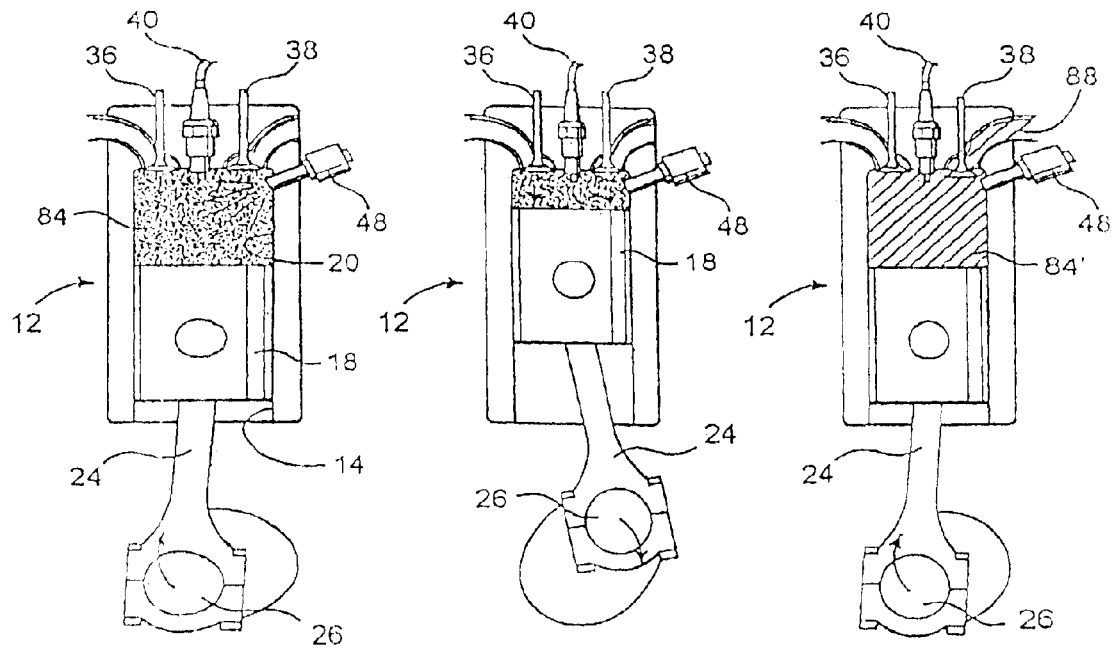
Figure 3:
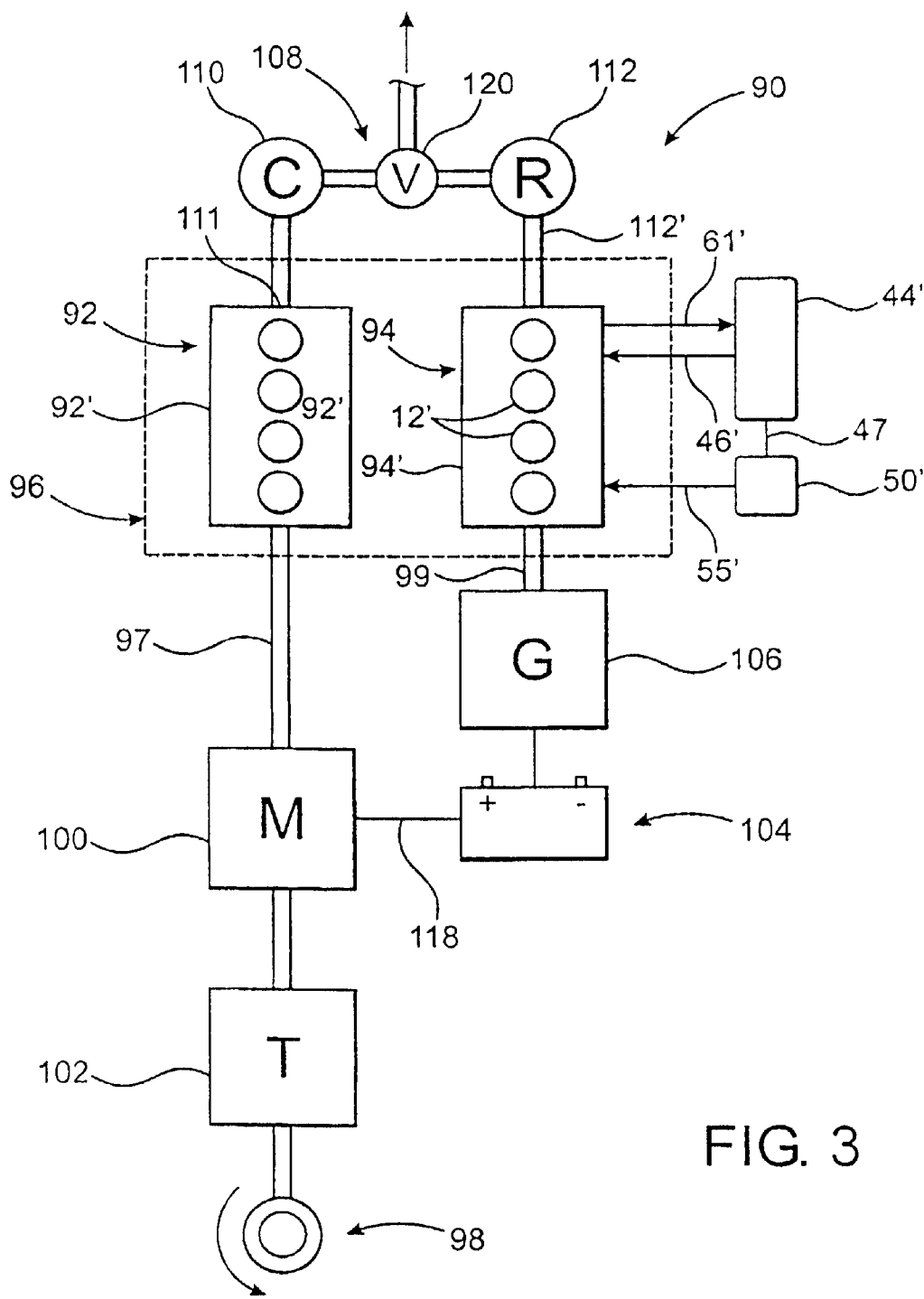
FIG. 3 is a schematic representation of another preferred embodiment of the present invention directed to a power generating assembly utilizing alternative power sources and incorporating at least some of the structural and operational features associated with the preferred embodiment of FIGS. 1 and 2A through 2F.

In this embodiment of the present invention, FIG. 2D is representative of both the end of the third stroke as well as the beginning of the fourth stroke of the six-stroke cycle. Accordingly, the internal combustion engine 10 of the present invention operates in a substantially conventional fashion through the first three strokes, represented by FIGS. 2A, 2B and 2C of the six-stroke cycle. Therefore the "energy content" of the interior 20 of each of the cylinders 14, starting generally at the end of the third stroke is to be determined for purposes of deciding the quantity and duration of water injection as emphasized herein.

As set forth above the preferred embodiment of the present invention comprises the determination of the energy content of each of the one or more cylinders utilizing a "default" determination or computation based on certain known or determined parameters including thermal efficiency on a particular IC engine and other related factors. More specifically, with any given IC engine the thermal efficiency, dependent in part on the variable operative conditions of the engine, is recognized as the quantity of heat that is converted to motive force at the wheels of the vehicle. The average thermal efficiency of an internal combustion engine is generally 40%. This means that approximately 60% of the heat goes to waste. Of the 60% of waste heat, half or 30% is lost in the exhaust gasses. An additional 25% is lost or removed by the cooling system associated with the engine. An additional 5% is lost due to friction. Therefore, by "default" we automatically know that generally about 30% of the heat of the fuel injected into any cylinder is lost with the exhaust gasses, in the conventional four stroke cycle engine, in the fourth or exhaust stroke. However it is recognized that in determining the parameters utilized in the default computation or determination of the energy content of a given cylinder, that the amount of heat lost to exhaust gasses may vary from the above noted 30%.

Therefore, applying the default determination of the preferred embodiment of the six-stroke cycle engine of the present invention, and with minimal or no modification to the software of the existing on-board computer, the "remnant" energy or energy content of a cylinder at the end of the third stroke may be automatically, simply and accurately determined at the moment the fuel is injected into the cylinder. More specifically, the default determination of the energy content or remant energy of a given cylinder is as follows:

a) mass of fuel injected per cylinder×calorific value per unit mass=total energy input per cylinder.
 b) total energy×thermal efficiency=motive force (horse power)
 c) total energy×30% (recognized value of the heat loss to exhaust gasses)=remant heat energy or energy content at the end of the third stroke.

As set forth above it is recognized that in a conventional four stroke engine, the beginning of the fourth stroke, immediately prior to the end of the third stroke, represents the beginning of the exhaust of the gasses in which 30% or a pre-recognized value of heat is loss. As set forth in detail herein the energy content of the cylinder is the value needed in determining a continuation of the forth and fifth stroke of the sixth stroke cycle of the present invention utilizing the controlled water to steam conversion. More specifically and as also emphasized herein the energy content of a given cylinder is determinative, along with other factors set forth herein, of the quantity and time period of water injected into the cylinder.

The fourth stroke comprises the piston head moving from a BDC position, representing the end of the third stroke, to a TDC position, thereby decreasing the volume within the cylinder interior 20 and resulting in an increased pressure on the water being injected into the cylinder interior 20. Accordingly, even though the temperature of the water being injected is increasing, the pressure is also increasing which, according to the aforementioned "Steam Tables" forces the water to be maintained in a liquid state as it is being continuously and/or periodically injected to the cylinder, preferably beginning at the end of the third stroke and during at least a majority of the duration of the fourth stroke represented in FIG. 2D. The water being injected is, therefore, prevented from turning into steam as soon as it is injected. In order to further assure proper and accurate determination of the energy content and as a result, both the quantity of water to be injected and the time or duration of water injection, the sensor structure $S_1$ further inputs into the central processor 44, the temperature of the water prior to it being injected. As set forth above, the hotter the water being injected the less amount of heat required to convert the water from water to steam and the greater amount of water that can be injected into the cylinder interior 20.

For purposes of clarity, the determination of the energy content is derived at what may be referred to as a first predetermined portion of the six-stroke cycle of the engine of the present invention. In addition, the water is injected, once the energy content of the cylinder has been determined, at the beginning of a second predetermined portion of the six-stroke cycle. Distinguishing the first and second predetermined portions of the six-stroke cycle from one another is of note since the energy content of a cylinder need be known preferably, immediately prior to injection of the water into the cylinder. Accordingly, the first predetermined portion of the cycle is herein defined as generally at the end of the third stroke and prior to the injection of water into the cylinder. Once the energy content of the cylinder is determined, the water is preferably injected at the end (BDC) of the third stroke and may continue during at least a portion or a majority of the fourth stroke. Therefore, the beginning of the injection of water at the end of the third stroke is herein defined as the second predetermined portion of the six-stroke cycle. It is again noted that this embodiment therefore differs from that disclosed in the above noted patent by the inventor herein, wherein the injection of water occurred in the second predetermined portion of the six-stroke cycle which was therein defined as the fourth stroke thereof.

Further, the pressure exerted on the injected water will be determined by the rate at which the cylinder interior 20 decreases in volume. This, of course, is directly proportional to the rate of the travel of the piston head 18 as it travels from its BDC position to its TDC position during the duration of the forth stroke. As set forth above, in order to absorb the maximum heat without turning into steam, the water must remain within the cylinder, during the fourth stroke for a maximum amount of time in that heat absorption in the fourth stroke depends, at least in part, upon the duration or length of time the stroke exists. This in turn depends upon the time it takes the piston head 18 to travel from its BDC position to its TDC position. Therefore, sensor structure $S_4$ is disposed and structured to determine the engine speed which is directly related to the rate of travel of the piston head 18 within the interior 20 of the cylinder 14 which is determinative of the time duration of the fourth stroke.

Upon reaching its TDC position at the beginning of the fifth stroke, as represented in FIG. 2E, the direction of the travel of the piston head 18 will reverse, traveling back towards its BDC position. The resulting increase in the volume of the cylinder interior 20 will decrease the pressure on the water injected during at least a majority of the duration of the fourth stroke (FIG. 2D). This decrease in pressure will allow the water to be converted into steam on a continuous basis as the pressure continuously decreases because of the downward travel of the piston head 18 within the cylinder interior 20, resulting in the auxiliary power stroke. Instantaneous "flashing" of all of the water injected during the end of the third stroke and during the fourth stroke as represented in FIG. 2D will be prevented since the pressure within the cylinder during the fifth, auxiliary power stroke represented in FIG. 2E, will be sufficient to maintain at least some of the water in a liquid state until the piston approaches the BDC position.

The sixth stroke represented in FIG. 2F is characterized as an exhaust stroke with the intake valve 36 maintained in a closed position and the exhaust valve 38 maintained in an open position, until the end of the sixth stroke. More specifically the combined steam and previously ignited combustible fluid 84' will be exhausted through outlet 88 upon an opening of the exhaust valve 38. It should be noted that the combustible fluid ignited during the initial power stroke, or stroke three, represented in FIG. 2C, will not be exhausted until the sixth stroke and will be exhausted from the interior of the cylinder 20 at the same time as the steam. With reference to FIG. 1, the exhausting of the steam and ignited combustible fluid will pass from outlet 88 to the exhaust system after having first passed through the condenser 52, as set forth above.

In summary, the central processor 44 accomplishes the following based on its responsiveness to some or all of the data received from the plurality of sensors $S_1$, $S_2$, $S_3$ and $S_4$ of the sensor assembly:

a) determines the "energy content" beginning at the end of the third stroke using the physical characteristics within the cylinder as sensed in whole or in part by the sensor assembly and determines the amount of energy that can be extracted from within the cylinder in order to convert the water to steam.

b) calculates the amount of water to be injected based on the previously determined "energy content" as well as the temperature of the water being injected before it enters the cylinder.

c) regulates and/or activates the injector structures 48 so as to inject the correct quantity of water periodically preferably beginning at the end of the third stroke and possibly continuing during a portion or at least a majority of the fourth stroke, using one or more injector structures 48 associated with each cylinder.

d) prevents the turning of water into steam on an instantaneous basis during the fourth stroke but rather regulates the conversion of water to steam on a controlled basis, substantially continuously over at least a majority of the duration of the fifth stroke, which is defined as the auxiliary power stroke of the six-stroke cycle.

As set forth in detail in FIGS. 3 and 4A through 4D, yet another preferred embodiment of the present invention comprises a power generating assembly generally indicated as 90. The power generating assembly 90 as with the preferred embodiments, described above, is particularly, but not exclusively, adaptable for use as the power plant of a motor vehicle. In addition, the power generating assembly 90, while incorporating certain of the structural and operational features described above and specifically relating to the water to steam conversion process, differs from the previously described embodiments of the present invention by being generally categorized as a "hybrid" power generating assembly.

As such, the power generating assembly 90 of the present invention comprises alternative power sources including a first power source 92 and a second power source 94, both of which are preferably mounted on a common engine block schematically indicated as 96. The hybrid aspects of the power generating assembly 90 are more clearly defined by the fact that the power take-off or drive wheels 98 of the vehicle in which the power generating assembly 90 is mounted receives power from both the first power source 92 and an electric motor 100. Accordingly, both the first power source 92 and the electric motor 100 are connected in direct driving relation to the power take-off 98 preferably through a transmission assembly 102. Also, in that the power demands of the vehicle are shared by the first power source 92 and the electric motor 100, the first power source may have a comparably reduced size, thereby further facilitating the mounting of the first and second power source on a common engine block 96.

It is of course important for the efficient operation of hybrid vehicles to maintain a continuous source of power either from the first power source 92 or the electric motor 100 or both. Therefore, the electric motor 100 is electrically connected to and capable of being continuously powered by a battery assembly 104. However, a distinguishing feature of the power generating assembly 90 is the maintenance of the battery assembly 104 in a continuous charged state through the provision of a generator assembly 106 connected in direct driven relation by the second power source 94. Moreover, a most preferred embodiment of the power generating assembly 90 comprises the first power source 92 being in the form of an internal combustion engine (IC) 92' having at least one, but more practically, a plurality of piston and cylinder assemblies of the type described in FIGS. 2A through 2C. The IC engine 92' defining the first power source 92 preferably operates through a multi-stroke cycle, such as a four stroke cycle.

The second power source 94 may be generally described as a water injection engine 94' and, while mounted on a common engine block 96 as the IC engine 92', functions independently of but in cooperation with the IC engine 92'. The water injection engine 94' creates useable power based on the water to steam conversion process as described with particular reference to FIGS. 2D through 2F of the embodiment of FIGS. 1 and 2 as described above. More specifically, the water injection engine 94' includes at least one piston and cylinder assembly generally indicated as 12' and shown in operation and detail in FIGS. 4A through 4D. As with the embodiment of FIG. 2D through 2F water is injected into the cylinder 14 by means of an injection assembly 48 deriving a supply of water from a water jacket 22 regulated by a water injection pump 50'. Similarly, a central processing unit (CPU) 44' regulates the timing of the water injection and the overall operation of the water injection engine 94' as well as certain operative features of the power generating assembly 90 as explained with reference to the embodiment of FIGS. 1 and 2 above. A plurality of sensors S1, S2, S3, S4, etc. may be strategically located throughout the engine block 96 and/or power generating assembly 90 and serve the same function of at least determining the "energy content" of a particular cylinder 14 into which the water is to be injected.

The heat required to facilitate the conversion of the injected water into steam is supplied by the exhaust gas issuing from the IC engine 92'. Again with reference to FIG. 3, the one or more piston and cylinder assemblies 12' included in the water injection engine 94' may be of smaller size than the piston and cylinder assemblies 12 associated with the IC engine 92'. Accordingly an exhaust processing assembly generally indicated as 108 is also incorporated within the power generating assembly 90.

The exhaust processing assembly 108 comprises a compressor 110 connected in direct fluid communication and receiving relation to an exhaust portion of the IC engine 92' as at 111. In order to accommodate the preferably smaller cylinder size of the one or more piston and cylinder assemblies 12', the volume of the exhaust gas issuing from the IC engine 92' is reduced by activation of the compressor 110. Once compressed, it is transferred to a reservoir 112 which is disposed in fluid communication with the water injection engine 94'. Moreover, the exhaust gas 114 is transferred as needed directly from the reservoir 112 to the one or more piston and cylinder assemblies 12' during an intake stroke as demonstrated in FIG. 4A of the water injection engine 94'. A conduit 112' establishes direct fluid communication between the reservoir 112 and the water injection engine 94' through which the exhaust gas 114 may be received within the cylinder 14 during the intake stroke of FIG. 4A.

As schematically and sequentially represented in FIGS. 4A through 4D, operation of the water injection engine 94' of the second power source 94 comprises the intake stroke of FIG. 4A, wherein the exhaust gas 114 enters the cylinder 14. The second stroke represented in FIG. 4B comprises a compression stroke, wherein the combination 116 of the hot exhaust gas and injected water are compressed. The water is injected through the injection assembly 48 into the cylinder 14 in the manner described with reference to the embodiment of FIGS. 1 and 2. The third stroke represented in FIG. 4C comprises the power stroke, wherein the water converts to steam based on the heat derived from the exhaust gas 114. FIG. 4D represents the exhaust stroke wherein the steam 118 is exhausted through the outlet valve 38 subsequent to the completion of the power stroke of FIG. 4C.

Moreover, in order to effectively provide sufficient time for the "mechanical process" of converting the injected water into steam, the first and second power sources 92 and 94 respectively are structured to operate within different speed ranges. More specifically, the IC engine 92' operates primarily within a first speed range which is significantly greater than a second speed range in which the second power source 94 primarily operates. As a result, the water injection engine 94' of the second power source 94 primarily operates within a second speed range which is slower and allows the "mechanical process" of converting the injected water into steam to occur in an efficient and effective manner.

Also since the first and second power sources 92 and 94 operate substantially independently of one another, the power output shaft 97 of the IC engine 92' is connected in direct driving relation to the power output 98. Conversely, the power output shaft 99 of the water injection engine 94' is connected in direct driving relation to the source of electric energy defined at least in part by the generator 106 and the battery assembly 104. It should be apparent therefore that the primary purpose of the second power source is to maintain active and required running engagement of the generator 106 in order to maintain the battery assembly adequately charged at all times. This of course results in a sufficient quantity of an electrical energy being delivered to the electric motor 100 by appropriate electrical connections there between, as at 118.

Other structural and operative features of the power generating assembly 90 includes a take-off or venting valve. 120 which will serve to vent the exhaust gas from the IC engine 92', downstream of the compressor, to an appropriate catalatic converter or other exhaust treatment facilities when it is determined when the reservoir 112 has sufficient or predetermined capacity to supply the second power source 94 with the hot exhaust gas. Also appropriate input and output connections 46' and 61' serve to establish a working relation between the sensors S1 through S4, as described with reference to the embodiment of FIG. 1, and the CPU 44'. Therefore the water to steam conversion process is at least partially controlled by the CPU 44' based at least in part on the energy content of the piston and cylinder assembly 12' as well as other physical and operative characteristics of the power generating assembly, as described above with reference to the embodiment of FIGS. 1 and 2. Similarly, appropriate conduit 55' serves to interconnect and deliver water to be injected to the one or more piston and cylinder assemblies 12' from the water injection pump 59.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A power generating assembly including alternative power sources, said power generating assembly comprising:
   a) a first power source operative within a first speed range and a second power source operative within a second speed range,
   b) said second speed range normally being slower than said first speed range,
   c) an electric motor assembly connected to and at least partially powered by a source of electric energy,
   d) said second power source connected in driving relation to said source of electric energy,
   e) said first power source and said electric motor assembly connected in driving relation to a power take-off, and
   f) said first power source comprising an internal combustion engine and a first power output shaft driven by said internal combustion engine; said second power source comprising a water injection engine connected in fluid communication with an exhaust portion of said internal combustion engine.

2. A power generating assembly as recited in claim 1 wherein said source of electric energy comprises a generator connected in driven relation to said second power source.

3. A power generating assembly as recited in claim 2 wherein said source of electric energy further comprises a battery assembly, said battery assembly electrically connected to said generator and structured to be recharged thereby.

4. A power generating assembly as recited in claim 3 wherein said battery assembly is electrically connected in energy delivering relation to said electric motor assembly.

5. A power generating assembly as recited in claim 1 wherein said first power source and said second power source are disposed on a common engine block.

6. A power generating assembly as recited in claim 1 wherein said second power source comprises a water to steam conversion process including an exposure of injected water to heat derived from exhaust gas from said internal combustion engine.

7. A power generating assembly as recited in claim 6 wherein said internal combustion engine comprises a first power output shaft connected in driving relation to said power take-off.

8. A power generating assembly as recited in claim 7 wherein said water injection engine comprises at least one piston and cylinder assembly operative through a multi-stroke cycle, said water injection engine further comprising a second, power output shaft driven by said piston and cylinder assembly.

9. A power generating assembly as recited in claim 8 wherein said piston and cylinder assembly of said second power source is connected in driving relation to said source of electric energy.

10. A power generating assembly as recited in claim 8 wherein said multi-stroke cycle includes at least an intake stroke for receiving exhaust gasses from said first power source and a compression stroke for compression of the exhaust gas and water injected into said piston and cylinder assembly.

11. A power generating assembly as recited in claim 1 wherein said water injection engine comprises at least one piston and cylinder assembly operative through a multi-stroke cycle and including a second power output shaft driven by said piston and cylinder assembly.

12. A power generating assembly as recited in claim 11 wherein said multi-stroke cycle includes at least an intake stroke for receipt of exhaust gasses from said internal combustion engine and a compression stroke for compression of said exhaust gas from said internal combustion engine and water injected into said piston and cylinder assembly.

13. A power generating assembly as recited in claim 12 further comprising a exhaust processing assembly disposed in interconnecting fluid communication between said first and second power sources and structured to process said exhaust gas from said first power source.

14. A power generating assembly as recited in claim 13 wherein said exhaust processing assembly comprises a reservoir disposed in fluid communication with said second power source and structured to retain exhaust gasses from said first power source.

15. A power generating assembly as recited in claim 14 wherein said exhaust processing assembly further comprises a compressor disposed and structured to reduce exhaust gas volume from said first power source.

16. A power generating assembly including alternative power sources, said power generating assembly comprising:
  a) a first power source and a second power source, said second power source comprising at least one piston and cylinder assembly,
  b) a source of electric energy connected in driven relation to said second power source,
  c) an electric motor assembly connected to and at least partially powered by said source of electric energy,
  d) said first power source and said electric motor assembly connected in driving relation to a power take-off, and
  e) said first power source comprising an internal combustion engine including an exhaust portion connected in fluid communication with an intake portion of said piston and cylinder assembly.

17. A power generating assembly as recited in claim 16 wherein said piston and cylinder assembly is operative through a multi-stroke cycle including a water to steam conversion stroke.

18. A power generating assembly as recited in claim 17 wherein said multi-stroke cycle further includes at least an intake stroke for receipt of exhaust gas from said internal combustion engine and a compression stroke for compression of said exhaust gas and water injected into said piston and cylinder assembly.

19. A power generating assembly as recited in claim 18 wherein said multi-stroke cycle further comprises a power stroke resultant from expansion of steam within said piston and cylinder assembly.

20. A power generating assembly as recited in claim 16 wherein said internal combustion engine comprises a first power output shaft connected in driving relation to said power take-off, said second power source comprising a second power output shaft connected in driving relation to said source of electric energy.

21. A power generating assembly as recited in claim 20 wherein said second power shaft is normally operative within a slower speed range than said first power output shaft.

22. A power generating assembly as recited in claim 20 wherein said source of electric energy comprises a generator and a battery assembly, said generator electrically connected to said battery for charging thereof.

23. A power generating assembly as recited in claim 22 wherein said electric motor assembly is connected to and at least partially powered by said battery assembly.

24. A power generating assembly as recited in claim 20 wherein said first and second power sources are mounted on a common engine block; said first and second power output shafts extending outwardly from said common engine block in driving connection with the power take-off and said source of electric energy respectfully.

25. A power generating assembly including alternative power sources, said power generating assembly comprising:
  a) a first power source comprising an internal combustion engine,
  b) a second power source comprising at least one piston and cylinder assembly operative through a multi-stroke cycle,
  c) a source of electric energy connected in driven relation to said second power source,
  d) an electric motor assembly connected to and powered by said source of electric energy,
  e) an injection assembly connected in fluid communication with a water supply and said piston and cylinder assembly,
  f) a sensor assembly at least partially connected to said piston and cylinder assembly and structured to determine physical characteristics thereof,
  g) a central processor responsive to said sensor assembly so as to determine the energy content within said piston and cylinder assembly during at least a first predetermined portion of said multi-stroke cycle,
  h) said central processor operatively connected to said injection assembly to control at least the quantity of water injected into said piston and cylinder assembly during a second predetermined portion of said multi-stroke cycle based on said energy content, and i) said first power source and said electric motor assembly connected in driving relation to a power take-off.

26. A power generating assembly including alternative power sources, said power generating assembly comprising:

a first power source and a second power source, said second power source comprising at least one piston and cylinder assembly, a source of electric energy connected in driven relation to said second power source, an electric motor assembly connected to and at least partially powered by said source of electric energy, said first power source and said electric motor assembly connected in driving relation to a power take-off, an injection assembly connected in fluid communication with a water supply and said piston and cylinder assembly of said second power source, and a sensor assembly at least partially connected to said piston and cylinder assembly and structured to determine physical characteristics of said piston and cylinder assembly.

27. A power generating assembly as recited in claim 26 further comprising a central processor responsive to said sensor assembly and operatively connected to said injection assembly to at least partially control the quantity of water injected into said piston and cylinder assembly.

* * * * *